US010594850B2

(12) United States Patent
Weinberg et al.

(10) Patent No.: US 10,594,850 B2
(45) Date of Patent: *Mar. 17, 2020

(54) INSTRUMENT CLUSTER METADATA TO SUPPORT SECOND SCREEN

(71) Applicant: Apple Inc., Cupertino, CA (US)

(72) Inventors: Joshua C. Weinberg, Campbell, CA (US); Thomas R. Powell, San Francisco, CA (US); David Rix Nelson, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/210,476

(22) Filed: Dec. 5, 2018

(65) Prior Publication Data

US 2019/0109934 A1  Apr. 11, 2019

Related U.S. Application Data

(63) Continuation of application No. 15/275,178, filed on Sep. 23, 2016, now Pat. No. 10,194,013.

(60) Provisional application No. 62/349,005, filed on Jun. 12, 2016.

(51) Int. Cl.
| | |
|---|---|
| *H04M 1/00* | (2006.01) |
| *H04M 1/725* | (2006.01) |
| *G06F 3/14* | (2006.01) |
| *G01C 21/36* | (2006.01) |
| *H04M 1/60* | (2006.01) |

(52) U.S. Cl.
CPC ...... *H04M 1/7253* (2013.01); *G01C 21/3661* (2013.01); *G06F 3/1454* (2013.01); *H04M 1/72527* (2013.01); *G06F 3/1423* (2013.01); *G09G 2340/0407* (2013.01); *H04M 1/6075* (2013.01)

(58) Field of Classification Search
CPC ............. H04M 1/6091; H04M 1/6075; H04M 2250/02; H04M 1/6083; B60R 11/0241; B60R 2011/0005; B60R 2011/0071; H04B 1/3877
USPC .............................................. 455/566–569.2
See application file for complete search history.

(56) References Cited

U.S. PATENT DOCUMENTS

| | | | |
|---|---|---|---|
| 6,928,654 B2 * | 8/2005 | Tranchina | G06F 3/1423 |
| | | | 348/837 |
| 2003/0071791 A1 * | 4/2003 | Hanson | G06F 1/1601 |
| | | | 345/169 |
| 2006/0184968 A1 | 8/2006 | Clayton | |
| 2008/0309820 A1 | 12/2008 | Kostepen | |
| 2010/0056195 A1 | 3/2010 | Nixon | |
| 2011/0185390 A1 | 7/2011 | Faenger | |
| 2011/0298927 A1 | 12/2011 | Taylor | |
| 2012/0243528 A1 | 9/2012 | Frye | |

(Continued)

*Primary Examiner* — Dai Phuong
(74) *Attorney, Agent, or Firm* — Blank Rome LLP

(57) ABSTRACT

A non-transitory computer-readable storage medium, a method, and a system for receiving display capabilities of a secondary vehicular display, determining metadata to display based on the display capabilities of the secondary vehicular display, formatting the displayable metadata, and transmitting the displayable metadata to the secondary vehicular display. The metadata is determined by receiving a data set from producer, comparing the data set against the display capabilities, and formatting the resultant data from the comparing as metadata.

20 Claims, 6 Drawing Sheets

(56) References Cited

U.S. PATENT DOCUMENTS

| | | |
|---|---|---|
| 2013/0096921 A1 | 4/2013 | Kuwamoto |
| 2013/0157647 A1 | 6/2013 | Kolodziej |
| 2014/0012497 A1 | 1/2014 | Pierfelice |
| 2014/0068713 A1 | 3/2014 | Nicholson |
| 2014/0092047 A1 | 4/2014 | Nara |
| 2014/0100740 A1 | 4/2014 | Chutorash |
| 2014/0220948 A1 | 8/2014 | Xia |
| 2015/0015479 A1 | 1/2015 | Cho |
| 2015/0045983 A1 | 2/2015 | Fraser |
| 2015/0145750 A1 | 5/2015 | Shin |
| 2015/0192426 A1 | 7/2015 | Foster |
| 2015/0234796 A1 | 8/2015 | Williams |
| 2015/0301665 A1* | 10/2015 | Kim ............... G06F 3/0488 345/173 |
| 2016/0001693 A1* | 1/2016 | Tamura ........... G01C 21/3632 340/441 |
| 2016/0044364 A1 | 2/2016 | Bai |
| 2016/0188275 A1* | 6/2016 | Huang .............. G06F 3/1423 715/761 |
| 2016/0205516 A1 | 7/2016 | Choi |
| 2017/0115828 A1 | 4/2017 | Langlois |
| 2017/0139531 A1* | 5/2017 | Kim ............... G06F 3/0488 |
| 2017/0174133 A1* | 6/2017 | Kumon ................. B60R 1/00 |

\* cited by examiner

INSTRUMENT CLUSTER METADATA TO SUPPORT SECOND SCREEN

TECHNICAL FIELD

Embodiments described herein generally relate to vehicular instruments, and more specifically to electronic instrument clusters.

BACKGROUND ART

Over the past decade, user handheld device deployment such as the iPhone® have grown rapidly (IPHONE is a registered trademark of Apple Computer Inc. of Cupertino, Calif.). These devices provide a networked general purpose computing platform in a small energy efficient package. Because of this incredible functionality, developers have been able to leverage the functionality into useful intuitive applications that improve the user's quality of life. Handheld devices now have become ubiquitous devices that are central to their user's world.

Implementations of navigation applications like Apple Maps offer locational and navigational information to the handheld device user. The accuracy, functionality, and usability of navigation applications have made them some of the most used applications on handheld device platforms.

However, barriers and limitations to a very desired use case, automobile navigation, persist. Handheld devices have relatively small screens that are difficult to view while maintaining the wide field of view for driving. Device mounts are often cumbersome and intrusive. Operating a vehicle while interacting with a handheld device is dangerous and illegal in some jurisdictions.

Past attempts at resolving these problems have involved interfaces to connect to head units in automobiles. The interfaces involved using wireless connections to present audio and video generated by the handheld device. Often the head units would simply mirror the screen of the handheld device, so the user would have a larger hands free view of the navigation application. However, this approach still can lead to the driver removing his visual focus from what is occurring in front of the car, and placing it on the head unit.

SUMMARY OF THE INVENTION

A smart phone connects with instrument cluster display of a vehicle. The smart phone queries the instrument cluster display for manufacturer implemented capabilities including fonts and space for individual text fields. The smart phone receives map navigation data from navigation application, such as Apple Maps. Based on instrument cluster display capabilities, the smart phone packages metadata, including formatting information specific to the display on the instrument cluster, in order to indicate to the driver an upcoming navigation change. This includes formatting turn by turn navigations, distance until next turn, estimated time until next turn, and instructing them to load an appropriate graphic for the type of maneuver.

DESCRIPTION OF EMBODIMENTS

The described embodiments of the invention include an instrument cluster with a display and a smart phone. The smart phone connects via a communication protocol to the instrument cluster. The instrument cluster sends the smart phone a list of capabilities formatted in a manner that the smart phone can understand. A navigation application executing on the smart phone accesses the instrument cluster display through an application programming interface (API). The navigation application provides navigation information to the application programming interface, which is then compared against the capabilities of the instrument cluster display, and the resultant applicable data is formatted and sent for display on the instrument cluster display.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "a computer system" can refer to a single computer system or a plurality of computer systems working together to perform the function described as being performed on or by a computer system.

Figure 1:
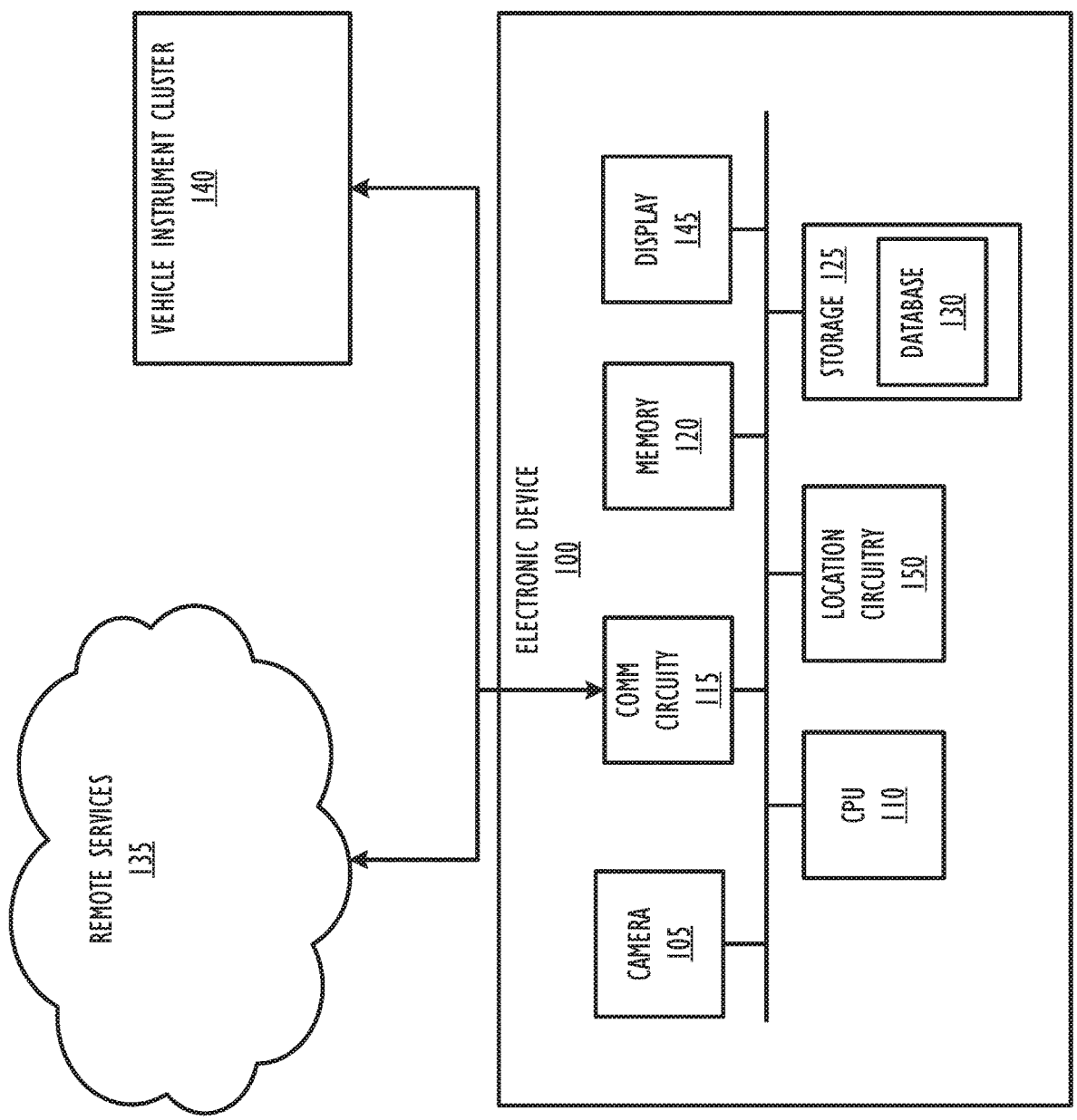
FIG. 1 is a block diagram illustrating a system for processing and transmitting metadata to an instrument cluster according to one or more embodiments.

FIG. 1 is a block diagram illustrating a system for processing and transmitting metadata to an instrument cluster according to one embodiment. Specifically, FIG. 1 depicts an electronic device 100 that is a computer system. Electronic device 100 may be connected to remote services 135 across a network, such as mobile devices, tablet devices, desktop devices, as well as network storage devices such as server computer systems and the like. In various embodiments, electronic device 100 may comprise a desktop computer, a laptop computer, a video-game console, an embedded device, a mobile phone, tablet computer, personal digital assistant, portable music/video player, or any other electronic device.

Electronic device 100 may include a central processing unit (CPU) 110. CPU 110 may be a system-on-chip such as those found in mobile devices and include one or more dedicated graphics processing units (GPUs). Electronic device 100 may also include a memory 120 and storage 125. Memory 120 and storage 125 may each include one or more different types of memory which may be used for performing device functions in conjunction with CPU 110. For example, memory 120 and storage 125 may include cache, ROM, and/or RAM. Memory 120 and storage 125 may store various programming modules and local database 130. Electronic device 100 may also include a camera 105. Camera 105 may include an image sensor, a lens stack, and other components that may be used to capture images (still and video). In one or more embodiments, the camera is part of the user device, such as the electronic device 100, and may be front-facing such that the camera is able to capture an image of a user in front of the device's display 145.

In one or more embodiments, a local database 130 may be stored in storage 125. Storage 125 may include any storage media accessible by a Memory 120 during use to provide instructions and/or data to the CPU 110, and may include multiple instances of a physical medium as if they were a single physical medium. For example, a machine-readable storage medium may include storage media such as magnetic or optical media, e.g., disk (fixed or removable), tape, CD-ROM, DVD-ROM, CD-R, CD-RW, DVD-R, DVD-RW, or Blu-Ray Disc™. (BLU-RAY DISC is a trademark owned by Blu-ray Disc Association). Storage media may further include non-volatile memory media such as RAM (e.g., synchronous dynamic RAM (SDRAM), double data rate (DDR, DDR2, DDR3, etc.) SDRAM, low-power DDR (LPDDR2, etc.) SDRAM, RAMBUS DRAM (RDRAM) (RAMBUS is a registered trademark of Rambus Inc.), static RAM (SRAM)), ROM, non-volatile memory (e.g., Flash memory) accessible via a peripheral interface such as the USB interface, etc. Storage media may include micro-electro-mechanical systems (MEMS), as well as storage media accessible via a communication medium such as a network and/or a wireless link.

Location circuitry 150 may be utilized to receive signals from geo location systems used to identify a point on Earth. The location circuitry 150 would commonly be operable to receive location data from the Global Positioning System (GPS), Global Navigation Satellite System (GLONASS), Beidou Navigation Satellite System (BDS), Galileo Global Navigation Satellite System (GNSS) or other comparable system. The location circuitry 150 may be coupled to the CPU 110 to provide navigation information to any application executing on the CPU 110.

In one or more embodiments, communication circuitry 115 may couple the electronic device 100 to remote services 135. The communication circuitry 115 may include but not be limited to network adapters, wired or wireless, implementing the physical layer and data link layer of the networking stack, including but not limited to IEEE 802.11, 802.3, LTE, and Bluetooth® (BLUETOOTH is a registered trademark of Bluetooth SIG, Inc) and Universal Serial Bus (USB). The communication circuitry 115 may implement any communication protocols necessary to interface the electronic device 100 with the remote services 135, including but not limited to transport control protocol/internet protocol (TCP/IP) and user datagram protocol (UDP).

The remote service 135 may provide cloud based services to the electronic device 100 via the communication circuitry 115. Generally, the remote services comprise remotely connected server computer systems providing data requested by the electronic device 100.

In some embodiments communicatively coupled to the electronic device 100 via the communication circuitry 115 is a vehicle instrument cluster 140. The vehicle instrument cluster 140 can include vehicular instrumentation including speedometer, odometer, tachometer, fuel gauge, engine temperature, and system warning indicators. Additionally, the vehicle instrument cluster 140 may include a display with varying levels of capabilities. The capabilities are set by the vehicle's manufacturer.

Figure 2:
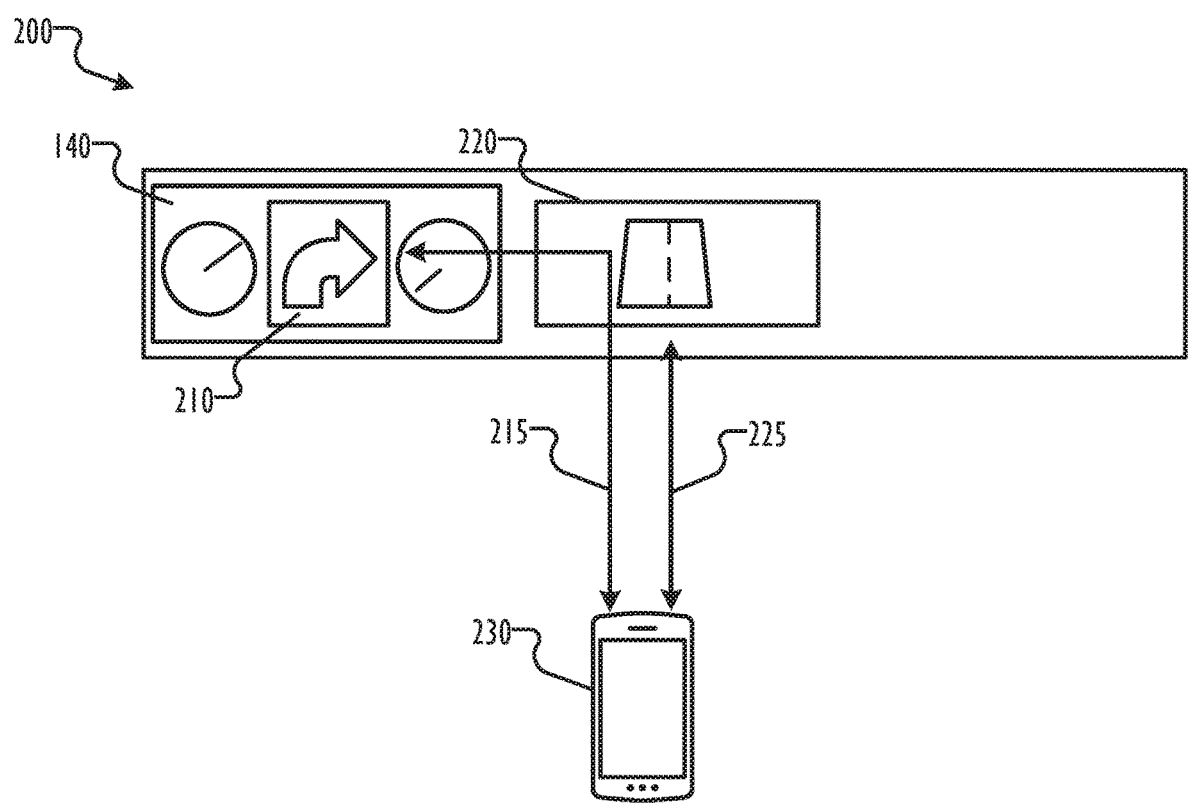
FIG. 2 is an illustration presenting a system processing metadata according to one or more embodiments.

FIG. 2 is an illustration presenting a system processing metadata according to one embodiment. A vehicular dashboard 200 houses many instruments necessary for properly operating a vehicle. The dashboard 200 includes an instrument cluster 205 and a head unit 220.

The instrument cluster 205 may be situated just beneath the driver's focus during operation so that when the driver needs feedback from the vehicle, the instrument cluster 205 is in the optimal place for viewing without necessitating losing focus on the road in front of the vehicle. In one embodiment the instrument cluster 205 may include instruments such as a speedometer, odometer, tachometer, fuel gauge, engine temperature, and system warning indicators. In one embodiment, the instrument cluster 205 may also contain a secondary display 210, wherein the head unit 220 may be the primary display.

Also included in the dashboard 200 can be a head unit 220. In one embodiment, the head unit 220 can include a computer, a coupled display, and a touchscreen coupled to the computer. The head unit 220 may serve as a primary interface for ancillary functions of the automobile. Ancillary functions may include air conditioning control, music and volume selection, communication interface selection, and maintenance status information.

In another embodiment, the head unit 220 may incorporate feature support for connected handheld device interaction such as Apple CarPlay™ (CARPLAY is a trademark of Apple Computer Inc. of Cupertino, Calif.). The head unit 220, in this embodiment, becomes an extension of the handheld device providing user interactivity similar to that of the handheld device itself. In this embodiment, applications made for CARPLAY will project their graphical content to the head unit 220 and provide a user experience similar to that of the handheld device.

In one embodiment, the instrument cluster 205 may contain a secondary display 210. As shown, the secondary display 210 may be embedded in the center of the instrument cluster 205. Alternatively, the secondary display 210 may be located outside of the instrument cluster 205. One example of a secondary display 210 outside of the instrument cluster 205 include heads-up displays (HUDs). The secondary display 210 may be of varying capability. In one embodiment, the secondary display 210 may be only capable of displaying text. In another embodiment, the secondary display 210 may be capable of displaying graphics in addition to text. The secondary display 210 may have preprogrammed graphical icons. The graphical icons may include common navigation icons such as but not limited to right turn, left turn, stay straight, and U-turn.

In another embodiment, multiple secondary displays may be supported. Anything that can delivered to the instrument cluster 205 based secondary display may also be delivered to a HUD based secondary display either exclusively or in parallel. Either secondary display may display different information from one another and have different display capabilities. For example string field lengths to display the current road name may be different for each secondary display and the data will be formatted individually for each secondary display.

The secondary display 210 may be coupled to the handheld device 230. In one embodiment, the secondary display 210 contains communication circuitry to establish and maintain the communication link 215 independently. The communication link 215 may be established by common wireless communication protocols such as BLUETOOTH. Alternatively, the secondary display 210 may not have an independent communication link 215 and may be attached to the head unit 220, which forwards data destined to the secondary display 210 through a different physical link between the head unit 220 and the secondary display 210. Additionally, the secondary display 210 may be capable of displaying information related to maneuvers and junctions. Maneuvers may be indications to the user on the operation of the vehicle, while junctions may be points at which maneuvers are to be performed. For example, a maneuver may be a right hand turn, and the accompanying junction may be at Smith Street. The junction may have an inferred intersection parameter or explicit intersection parameter. An example of inferred intersection parameter may be the roadway the vehicle is currently on, where the junction takes place at the intersection of the inferred parameter and an explicit parameter. The explicit intersection parameter may include all intersection roadways. For example, an explicit intersection parameter for two roads may be "Jones Street at Smith Street."

The head unit 220 may be connected to the handheld device 230. The communication link 225 between the head unit 220 and the handheld device 230 may be wireless, via an appropriate protocol such as BLUETOOTH, or wired through an appropriate wired interface, such as a Lightning® cable (LIGHTNING is a registered trademark of Apple Computer Inc. of Cupertino, Calif.). The connection method for either communication link 215, 225, wired or wireless, is not to be construed as limited to the examples set forth, as they are just used for description.

Figure 3:
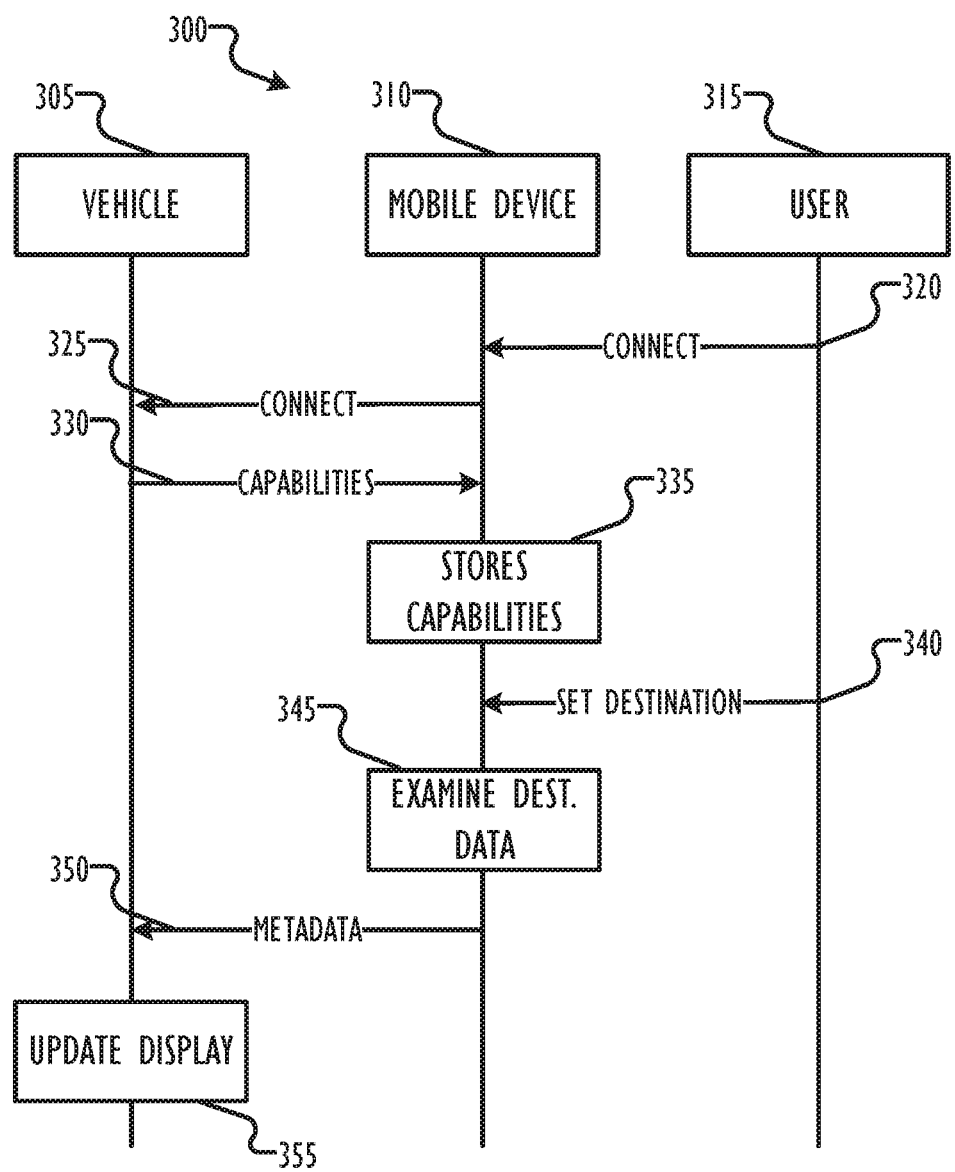
FIG. 3 is an activity diagram displaying the relationships between system components according to one or more embodiments.

FIG. 3 is an activity diagram 300 displaying the relationships between system components according to another embodiment. The system components include a vehicle 305 which includes a head unit capable of connecting to a mobile device 310 and a secondary display with some functionality for displaying an image. The mobile device 310 may be a cellular phone, a laptop, a tablet, or any other electronic device capable of connecting to the head unit of the vehicle 305.

The user 315 makes a request to connect 320 the mobile device 310 to the vehicle 305. The request may be made through a navigation application operable to interface with the head unit.

The mobile device 310 responsive to the user request to connect 320, attempts to connect 325 with the vehicle 305. If the connect request is honored, the vehicle 305 establishes connection with the mobile device 310. The connect request may be implemented utilizing BLUETOOTH, USB, WiFi, or any other communication technology suitable to support the coupling of the mobile device 310 and the head unit of the vehicle 305. Apple's iAP, built on the BLUETOOTH stack, is an example of an interface that will allow the connection, transmission, and reception of data.

The vehicle 305 provides capabilities 330 to mobile device 310. The capabilities may include that each display of the vehicle 305 may display navigation metadata, including how many characters can be displayed for each field of data that is supported and how many maneuvers it can store. For example, messages including fields that correspond to capabilities may be included in the capabilities 330. The fields may include unique identifiers or names. The fields may also include second display specific data including the maximum current road name length, maximum destination road name length, maximum after maneuver road name length, maximum maneuver description length, and maximum guidance maneuver storage capacity. All the fields would provide input to the mobile device 310 to describe the capabilities of the secondary display.

The mobile device 310 stores the capability information 335. The user 315 may request a set destination 340 on the mobile device 310. The request may be received as input from a navigational application.

Upon receiving request to set a destination, the mobile device 310 may examine the destination. Accordingly, the mobile device 310, compares the destination information, including maneuvers to the stored capabilities 335. The mobile device 310 determines the extent to which the vehicle 305 through the secondary display can display the maneuver data.

The mobile device 310 may send the vehicle 305 maneuver metadata 350 strings appropriate for the field size reported on connection, including detailed description of each navigable junction as well as flags to show "secondary" instruction where necessary. Secondary instructions may include multiple instructions or maneuvers to be performed in relatively short succession. If the vehicle 305 is capable of displaying secondary instructions, it provides the user 315 with a visual cue that another maneuver is imminent. The message sent to the vehicle 305 including the metadata may be a navigation route guidance update, which may include fields for states, current road names, the destination name, estimated time of arrival, time remaining to destination, distance remaining, distance remaining to the next maneuver, a list of current maneuvers, and a maneuver count. The states may include route guidance states such as, not active, active/guiding, arrived, loading, locating, and rerouting. The states may also include maneuver states which indicate the state during a maneuver which may include continue, initial, prepare and execute.

The mobile device 310 may also send navigation route guidance maneuver info update messages. These messages may include fields like the maneuver description, maneuver type, the after—maneuver road name, and junction type. The maneuver type field may be an enumerated type which defines common driving maneuvers including left turn, right turn, straight, U-turn, off ramp, on ramp, keep left, and keep right. The maneuver type is not intended to be limited to maneuvers listed here, but instead is intended to correspond to any maneuvers necessary to complete the navigation. The maneuver types may also be associated with stored graphics in the secondary display of the vehicle 305, so that upon the receipt of a maneuver type, the secondary display updates to include the stored graphic for that maneuver. The vehicle 305 updates the display 355 based on the received metadata 350.

In some embodiments, it may be necessary for the vehicle 305 to synchronize with the mobile device 310. As some metadata may be time sensitive, the vehicle 305 needs to update the mobile device 310 with synchronization data 340, 370 so that the timing between the vehicle 305 and mobile device 310 is consistent. This may be important, for example. When navigation updates require quick updates.

Figure 4:
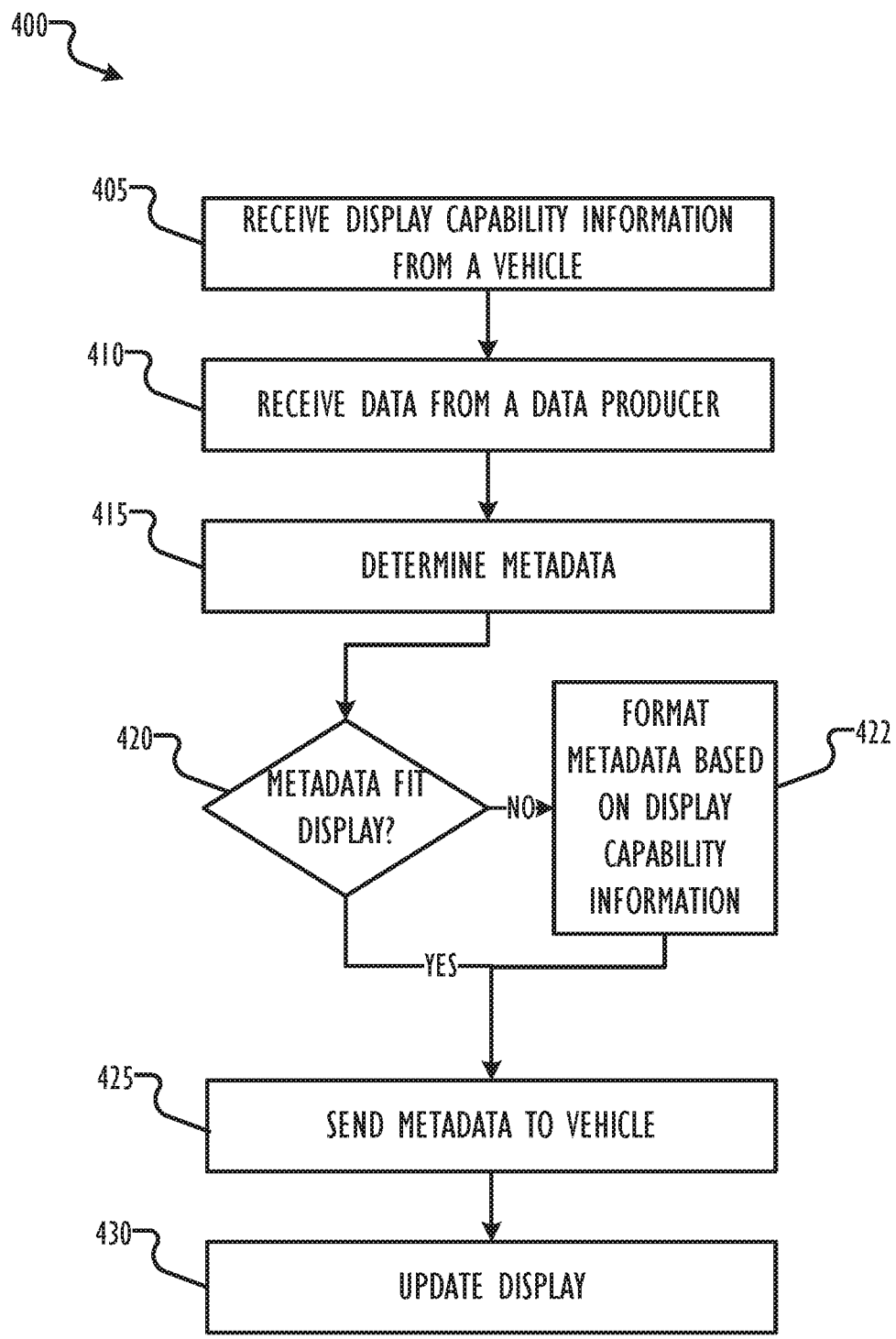
FIG. 4 is a flowchart processing display capability information to generate metadata according to one or more embodiments.

FIG. 4 is a flowchart processing display capability information to generate metadata according to one embodiment. At block 405, the metadata creation operation 400 receives the display capability information regarding the secondary display 210. In some embodiments, the display capability information may be included in storage local to the secondary display 210, including but not limited to firmware. Display capabilities may include the number of pixels available to an application, fonts, and text characters.

At block 410, the metadata creation operation 400 receives data to be displayed. The data to be displayed may come from a data producer executing on a handheld device. Not all of the data received may be displayed based on the display capability information. The data producer may be any hardware, software, or firmware that provides data that may be formatted for the presentation on the secondary display 210 of a vehicle. The data producer may be data from a navigation application such as Apple Maps, or it may be a news application sending a news alert, or it may be a weather application sending a weather notification. Data may be received through inter-process communication (IPC) implemented through shared memory, message queues, pipes or sockets.

At block 415, the metadata creation operation 400 determines metadata based on the display capability information. The received display capability information may be programmatically parsed into atomic elements pertaining to each feature element. For example, a single text element, possibly pertaining to the current road name, maybe extracted from the display capability information, and stored as a separate object. The object may have defined fields, pertaining to the available text characters available to be displayed. Additional fields may include enumerations for maneuvers, descriptions of the object, and information on how the object may be formatted as input to the secondary display 210. Each atomic element may then be organized into a data structure for retrieval, comparison, and reformatting. The data structure may be any structure capable of holding objects and being traversed by a process (e.g., an executing software entity) that presents the API's functionality as described herein, including but not limited to linked lists, arrays, and trees. Once the display capability has been received, parsed and organized, the metadata may be determined prior to being transmitted back to the secondary display 210.

At decision point 420, a decision may be made based on whether the metadata is compatible with the display capabilities as described by the display capability information. This may include comparing string size availability for maneuver detail information, the number of maneuvers available, units of measure available, and relevant graphical display ability associated with a maneuver. If the display capability meets the requirements of the metadata, the decision tree proceeds to block 425. However, if the display capability does not meet the requirements of the metadata, further processing may be necessary.

At block 422, the metadata creation operation 400 may format the metadata based on the display capability information. The metadata creation operation 400 may format the metadata in a way understood by the secondary display. In one embodiment, the formatting information may be parsed out of the display capability information. For example, any extracted atomic element from the display capability information, may include details on how to format the metadata. This may include object fields indicating text information, graphic information, and positioning information. In another embodiment, the formatting information may be specified by an external, well known standard. A well-known standard may be published by the original equipment manufacturer of either the vehicle or the secondary display 210 itself in how to format communication messages operable to be understood by the secondary display 210. By utilizing either the formatting information or the standards-based formatting, the metadata may be displayed in accordance with the display capabilities. For example, either approach may yield truncated strings when the metadata includes more characters than the display may allow. Another approach may include an intelligent application of string shortening, where redundant characters that a human would infer, may be removed.

At block 425, the metadata creation operation 400 may send the metadata to the vehicle. The metadata may be packaged in a properly formatted message header for the underlying transport protocol. At block 430, the secondary display is updated to reflect the transmitted metadata, including any characters packaged at block 422, as well as the secondary display's interpretation of maneuver instructions. For example, if a maneuver instruction includes a graphic enumeration pertaining to a "turn right" command with a value of 2, the secondary display will interpret that enumeration to display a graphic corresponding to "turn right." Additionally, if there is no internal graphic corresponding to a maneuver, the secondary display may display a default graphic or nothing at all.

Figure 5:
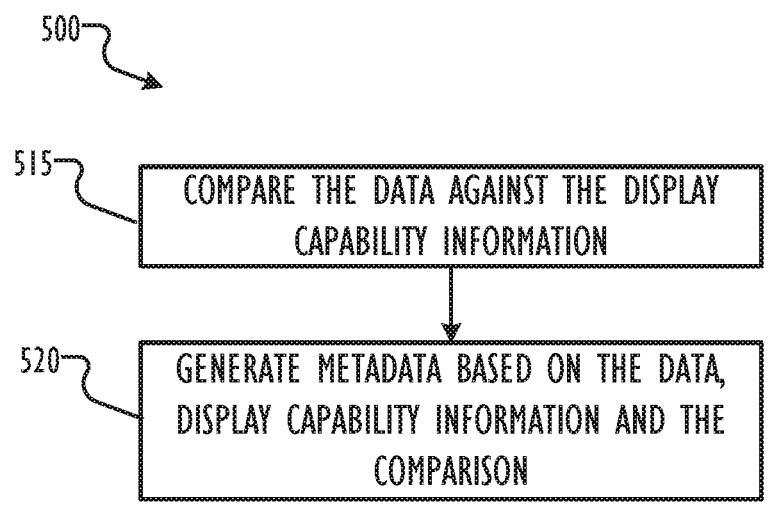
FIG. 5 is a flowchart generating metadata from a data producer according to one or more embodiments.

FIG. 5 is a flowchart showing an illustrative comparison operation 500 generating metadata from a data producer according to one embodiment. The comparison operation 500 corresponds to one embodiment of block 410 and 415.

At block 515, the comparison operation 500 may compare the received data against the display capability information. The data received at block 410 may be deconstructed into atomic elements, or alternatively may be received in atomic form. The API determines the form of the data. The data atomic elements may then be stored in a data structure for simpler manipulation.

The data structure containing the data atomic elements may then be compared against the data structure containing display capability information atomic elements. If there is a match in that a data atomic element meets the requirements of a display capability information atomic elements, then the data atomic element may fulfill the comparison.

The elements that fulfill the comparison may be placed into a separate data structure to be used to generate the metadata. Alternatively, the data atomic elements may just be flagged as successful comparisons and not placed into a separate data structure.

At block 520, the comparison operation 500 may generate metadata based on the data, display capability information and the comparison. The separate data structure may then be traversed. As the data structure is traversed, each traversed data atomic element may reference the corresponding display capability information element, so that the proper format for the secondary display 210 may be determined.

Figure 6:
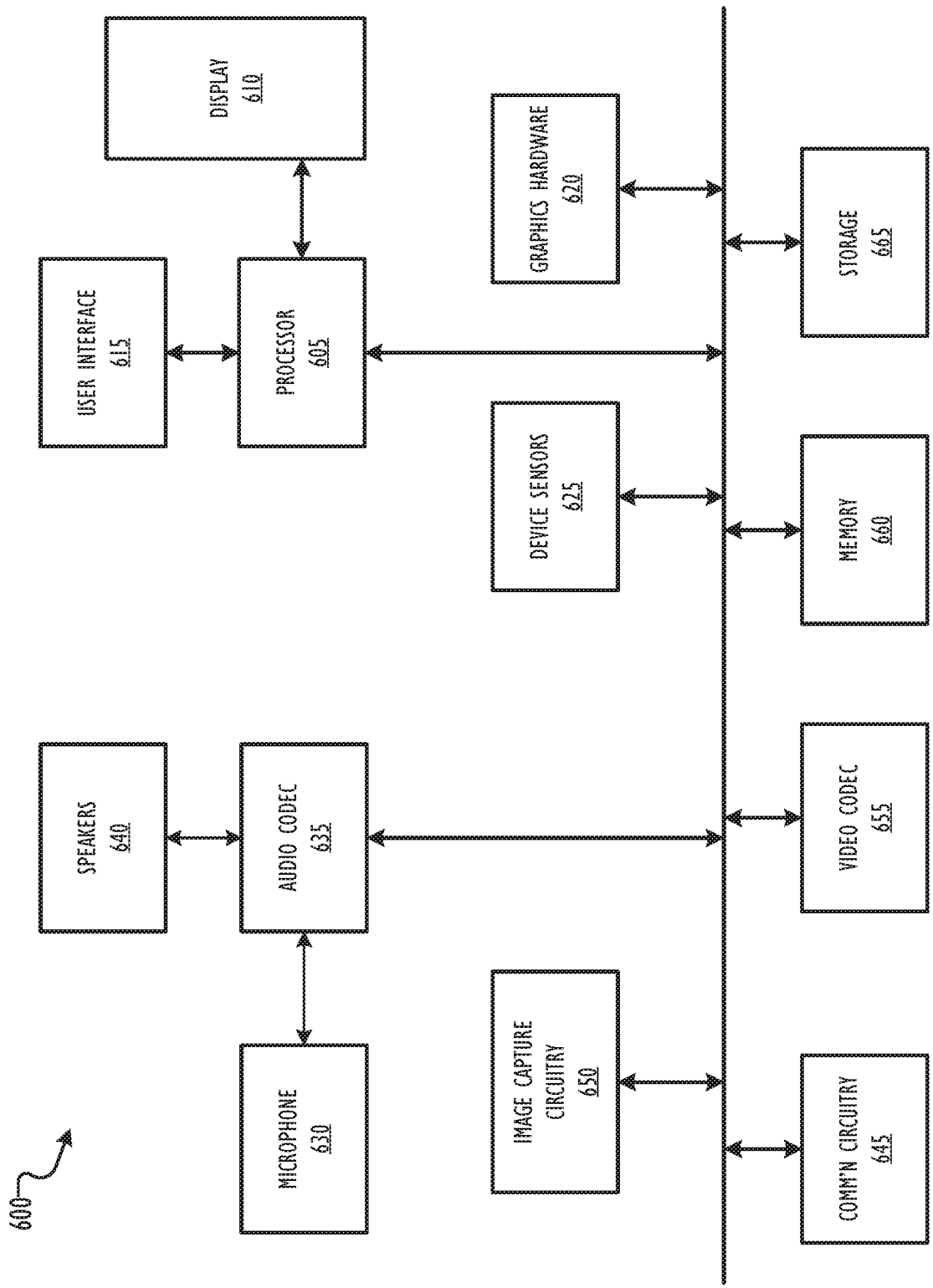
FIG. 6 is a block diagram showing modules of an electronic device for receiving display capabilities and generating metadata according to one or more embodiments.

FIG. 6 is a block diagram showing modules of an electronic device for receiving display capabilities and generating metadata according to one embodiment.

Multifunction electronic device 600 may include processor 605, display 610, user interface 615, graphics hardware 620, device sensors 625 (e.g., proximity sensor/ambient light sensor, accelerometer and/or gyroscope), microphone 630, audio codec(s) 635, speaker(s) 640, communications circuitry 645, digital image capture unit 650 video codec(s) 655, memory 660, storage device 665, and communications bus 670. Multifunction electronic device 600 may be, for example, a digital camera or a personal electronic device such as a personal digital assistant (PDA), personal music player, mobile telephone, or a tablet computer. In some embodiments, multifunction electronic device 600 corresponds to electronic device 100.

Processor 605 may execute instructions necessary to carry out or control the operation of many functions performed by device 600 (e.g., such as the generation and/or processing of images in accordance with this disclosure). Processor 605 may, for instance, drive display 610 and receive user input from user interface 615. User interface 615 may allow a user to interact with device 600. For example, user interface 615 can take a variety of forms, such as a button, keypad, dial, a click wheel, keyboard, display screen and/or a touch screen. Processor 605 may also, for example, be a system-on-chip such as those found in mobile devices and include a dedicated graphics processing unit (GPU). Processor 605 may be based on reduced instruction-set computer (RISC) or complex instruction-set computer (CISC) architectures or any other suitable architecture and may include one or more processing cores. Graphics hardware 620 may be special purpose computational hardware for processing graphics and/or assisting processor 605 to process graphics information. In one embodiment, graphics hardware 620 may include a programmable graphics processing unit (GPU).

Sensor and camera circuitry 650 may capture still and video images that may be processed, at least in part, by video codec(s) 655 and/or processor 605 and/or graphics hardware 620, and/or a dedicated image processing unit incorporated within circuitry 650. Images so captured may be stored in memory 660 and/or storage 665. Memory 660 may include one or more different types of media used by processor 605 and graphics hardware 620 to perform device functions. For example, memory 660 may include memory cache, read-only memory (ROM), and/or random access memory (RAM). Storage 665 may store media (e.g., audio, image and video files), computer program instructions or software, preference information, device profile information, and any other suitable data. Storage 665 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 660 and storage 665 may be used to tangibly retain computer program instructions or code organized into one or more modules and written in any desired computer programming language. When executed by, for example, processor 605 such computer program code may implement one or more of the methods described herein.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A non-transitory computer-readable storage medium comprising instructions stored thereon to cause one or more processors of a vehicle to:
   receive, from a portable electronic device, a first request to connect to a primary display of the vehicle;
   establish a connection with the portable electronic device;
   receive first display information from the portable electronic device;
   display the received first display information on the primary display of the vehicle;
   receive, from the portable electronic device, a second request to connect to an instrument cluster display of the vehicle;
   transmit, to the portable electronic device, display capability information for the instrument cluster display of the vehicle, the display capability information defining one or more object fields corresponding to capabilities of the instrument cluster display;
   receive formatted metadata from the portable electronic device, the formatted metadata based on the defined one or more object fields; and
   output second display information for display on the instrument cluster display, the second display information based on the one or more object fields.

2. The non-transitory computer-readable storage medium of claim 1, further comprising instructions to cause the one or more processors to transmit synchronization data to the portable electronic device.

3. The non-transitory computer-readable storage medium of claim 2, wherein the synchronization data comprises timing information for the instrument cluster display.

4. The non-transitory computer-readable storage medium of claim 1, wherein the display capability information includes one or more of character limitations, screen resolution, and integrated graphics.

5. The non-transitory computer-readable storage medium of claim 1, wherein the instructions further cause the one or more processors to associate one or more of the defined one or more object fields with a stored graphic, and wherein the second display information includes at least the stored graphic.

6. The non-transitory computer-readable storage medium of claim 1, wherein the primary display comprises a head unit of the vehicle.

7. The non-transitory computer-readable storage medium of claim 1, wherein the first display information comprises graphical data from the portable electronic device.

8. The non-transitory computer-readable storage medium of claim 1, wherein the display capability information includes at least an indication of one or more graphical icons supported by the instrument cluster display of the vehicle, and wherein the formatted metadata is formatted into one or more object fields based on the indicated one or more graphical icons supported.

9. The non-transitory computer-readable storage medium of claim 1, wherein the metadata comprises one or more of navigation information, news information, and weather information.

10. A method for updating displays of a vehicle, comprising:
   receiving, from a portable electronic device, a first request to connect a primary display of the vehicle;
   establishing a connection with the portable electronic device;
   receiving first display information from the portable electronic device;
   displaying the received first display information on the primary display of the vehicle;
   receiving, from the portable electronic device, a second request to connect to an instrument cluster display of the vehicle;
   transmitting, to the portable electronic device, display capability information for the instrument cluster display of the vehicle, the display capability information defining one or more object fields corresponding to capabilities of the instrument cluster display;

receiving formatted metadata from the portable electronic device, the formatted metadata based on the defined one or more object fields; and outputting second display information for display on the instrument cluster display, the second display information based on the one or more object fields.

11. The method of claim 10, further comprising transmitting synchronization data to the portable electronic device.

12. The method of claim 11, wherein the synchronization data comprises timing information for the instrument cluster display.

13. The method of claim 10, wherein the display capability information includes one or more of character limitations, screen resolution, and integrated graphics.

14. The method of claim 10, further comprising associating one or more of the defined one or more object fields with a stored graphic, and wherein the second display information includes at least the stored graphic.

15. The method of claim 10, wherein the primary display comprises a head unit of the vehicle.

16. The method of claim 10, wherein the first display information comprises graphical data from the portable electronic device.

17. The method of claim 10, wherein the display capability information includes at least an indication of one or more graphical icons supported by the instrument cluster display of the vehicle, and wherein the formatted metadata is formatted into one or more object fields based on the indicated one or more graphical icons supported.

18. The method of claim 10, wherein the metadata comprises one or more of navigation information, news information, and weather information.

19. A display system for a vehicle comprising:
a primary display of the vehicle;
an instrument cluster display of the vehicle;
one or more processors; and
a memory communicatively coupled to the primary display, the instrument cluster display, and the one or more processors and having stored instructions that, when executed by at least one of the one or more processors, cause the display system to:
receive, from a portable electronic device, a first request to connect the primary display;
establish a connection with the portable electronic device;
receive first display information from the portable electronic device;
display the received first display information on the primary display;
receive, from the portable electronic device, a second request to connect to the instrument cluster display;
transmit, to the portable electronic device, display capability information for the instrument cluster display, the display capability information defining one or more object fields corresponding to capabilities of the instrument cluster display;
receive formatted metadata from the portable electronic device, the formatted metadata based on the defined one or more object fields; and
output second display information for display on the instrument cluster display, the second display information based on the one or more object fields.

20. The system of claim 19, further comprising instructions to cause the display system to transmit synchronization data to the portable electronic device.

* * * * *